US012800434B2

(12) United States Patent
Cheng et al.

(10) Patent No.: US 12,800,434 B2
(45) Date of Patent: Nov. 17, 2026

(54) PHASE DETECTION DEVICE AND METHOD FOR OPTICAL ELEMENT

(71) Applicant: SHENZHEN METALENX TECHNOLOGY CO., LTD, Shenzhen (CN)

(72) Inventors: Jiaping Cheng, Shenzhen (CN); Junming Dong, Shenzhen (CN); Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD, Shenzhen (CN)

( * ) Notice: Subject to any disclaimer, the term of this patent is extended or adjusted under 35 U.S.C. 154(b) by 159 days.

(21) Appl. No.: 18/934,213

(22) Filed: Oct. 31, 2024

(65) Prior Publication Data

US 2025/0146901 A1 May 8, 2025

(30) Foreign Application Priority Data

Nov. 2, 2023 (CN) ......................... 202311449789.4
Nov. 2, 2023 (CN) ......................... 202322963580.1

(51) Int. Cl.
*G01M 11/02* (2006.01)

(52) U.S. Cl.
CPC ............................... *G01M 11/0271* (2013.01)

(58) Field of Classification Search
CPC ................................................. G01M 11/0271
See application file for complete search history.

(56) References Cited

U.S. PATENT DOCUMENTS 11,815,462 B2 * 11/2023 Finnie .................... G01J 3/0208
2007/0229848 A1 * 10/2007 Yamamoto ................ G01J 9/02
356/515

FOREIGN PATENT DOCUMENTS

| | | | | |
|---|---|---|---|---|
| CN | 112014070 A | * | 12/2020 | ........ G01M 11/0271 |
| CN | 212646048 | | 3/2021 | |
| CN | 216284228 | | 4/2022 | |
| CN | 110057554 | | 2/2024 | |
| RU | 2544873 C1 | * | 3/2015 | |

* cited by examiner

*Primary Examiner* — Hina F Ayub
(74) *Attorney, Agent, or Firm* — JCIPRNET

(57) ABSTRACT

A phase-detection device and method for an optical element are provided, along the direction of the optical path the phase-detection device includes: a light source, a beam collimator, a diffraction element and an imaging detector; the optical element is set between the filter and the diffraction element; the diffraction element includes a mesh mask region and an array region segmented by the mesh mask region; mesh mask region blocks lights of a target wavelength; the array region includes a first class of cell and a second class of cell, and the first class of cell and the second class of cell are alternatively arranged; the first class of cell provides a first phase for the lights of target wavelength, and the second class of cell provides a second phase for lights of target wavelength; a phase difference between the first phase and second phase is $\pi$ rad.

20 Claims, 11 Drawing Sheets

PHASE DETECTION DEVICE AND METHOD FOR OPTICAL ELEMENT

CROSS-REFERENCE TO RELATED APPLICATION

This application claims the benefit of priority from Chinese Patent Application No. 202311449789.4 and No. 202322963580.1, filed on Nov. 2, 2023. The entirety of each of the above mentioned patent applications is hereby incorporated by reference herein and made a part of this specification.

TECHNICAL FIELD

The present disclosure relates to the optical field, in particular to a phase detection device and method for an optical element.

BACKGROUND

The wafer-level optical element is obtained by performing a single exposure on one piece of wafer to process a plurality of optical elements. In the optical field, after producing lots of optical elements, the optical elements need to be performed a phase detection to ensure whether the optical element can provide the target phase that meets target requirements, and it can further judge whether the optical performance of the optical elements is qualified.

However, in the related technology, the phase detection is usually performed on a single optical element. Therefore, if the phase detection needs to be performed on the optical elements of one wafer-level optical element, the wafer-level optical element needs to be cut into lots of individual optical elements. Then, the phase detection is performed separately on each optical element obtained by cutting, resulting in the low detection efficiency. And the phase detection device for optical elements provided by the related technology has a low accuracy of phase detection.

SUMMARY

One purpose of the present application is to provide a phase detection device for an optical element. Even if the lights emitted by the light source have incoherent lights with very low coherence, the diffracted lights from the diffraction element can produce enough interference between each other. Therefore, the lights emitted by the light source mustn't have an extremely high coherence, thus avoiding noisy speckles producing in the interference image. In this way, the accuracy of phase detection improves.

In the first aspect, a phase detection device for the wafer-level optical element is provided, along the direction of the optical path the phase-detection device includes: a light source, a beam collimator, a diffraction element and an imaging detector;

- the optical element to be detected is set between the filter and the diffraction element;
- the diffraction element includes a mesh mask region and an array region segmented by the mesh mask region; the mesh mask region is used to block lights of a target wavelength;
- the array region includes a first class of cell and a second class of cell, and the first class of cell and the second class of cell are alternatively arranged;
- the first class of cell is used to provide a first phase for the lights of the target wavelength, and the second class of cell is used to provide a second phase for the lights of the target wavelength; a phase difference between the first phase and the second phase is $\pi$ rad;
- the device further includes a process; the process is communicatively connected to the imaging detector to determine a phase corresponding to the optical element according to an interference image recorded by the imaging detector.

In one embodiment, the optical element is a wafer-level optical element and the phase detection device includes: a displacement platform, and the displacement platform include a carrier;

- the wafer-level optical element includes a plurality of sub-optical elements;
- when the wafer-level optical element is mounted on the carrier, the wafer-level optical element is set on the optical path between the filter and the diffraction element.

In one embodiment, the phase detection device further includes: a platform base;

- a bottom surface of the displacement platform is fixed to a top surface of the platform base;
- an open hole is set on the bottom surface of the displacement platform, and the open hole is through the platform base simultaneously;
- an open end of the platform base is set toward a side of the beam collimator; a cavity is set inside the platform base; a beam steering device is set inside the displacement platform;
- the filter is set on the optical path, and is between the beam collimator and the top surface of the displacement platform;
- the carrier is a tray, and the tray is set on the top surface of the displacement platform, and the tray is capable of moving parallel to the top surface of the displacement platform; the tray is set on the optical path between the filter and the diffraction element; the shape of the tray is a ring;
- a step structure is set along an inner wall of the tray; the wafer-level optical element set on the tray by setting on the step structure;
- the displacement platform includes a carrier.

In one embodiment, a plurality of step structures are set along the inner wall of the tray.

In one embodiment, the inner wall of the tray includes at least two ear structures, and the two ear structures are convex to an outer wall of the tray.

In one embodiment, there is at least one notch structure set on an edge of the wafer-level optical element; there is at least one projection structure set on an inner wall of the wafer-level optical element; when the wafer-level optical element is attached to the platform of the step structure, the projection structure is embedded in the notch structure.

In one embodiment, the beam steering device is a reflecting mirror.

In one embodiment, an aperture slot is set on the optical path between the beam collimator and the tray; and an aperture of the aperture slot is adjusted.

In one embodiment, the device includes a bracket support, and the bracket support is set on a side of the displacement platform;

- the bracket support includes a support, and the bracket support is set on the displacement base;
- the imaging detector is fixed to the support, and the imaging detector is vertically facing toward the displacement platform;
- the diffraction element is set below the imaging detector.

In one embodiment, the bracket support includes a top surface of the bracket support fixed to the platform base and at least three support rods;

the bracket support is a dome bracket;

the dome bracket is set over the displacement platform; and the imaging detector is fixed to the center of the dome bracket.

In one embodiment, the beam collimator is a reflective collimator.

In one embodiment, the diffraction element is a hybrid grating, and the hybrid grating includes a mesh mask grating and a 2D array grating;

in the 2D array grating, a height difference between the first class of cell and the second class of cell is $\lambda/2(n-1)$;

wherein, $\lambda$ is a target wavelength, n is a refractive index of the 2D array grating at the target wavelength.

In one embodiment, wherein an antireflection film is coating on one surface facing toward an incident light of the 2D array grating.

In one embodiment, a distance between the diffraction element and the imaging detector is greater than or equal to 1 mm, and is less than or equal to 5 cm.

In one embodiment, the diffraction element is fixed below the imaging detector by the support.

In one embodiment, the diffraction element is fixed below the imaging detector by a structural element of the imaging detector.

In one embodiment, the structural element is a tubular structural element, and the tubular structural element includes an inner wall of threads;

the outer wall of the imaging detector includes threads, and the tubular structural element is set on the outer wall of the imaging detector by threads;

the tubular structural element extends downward to the outer wall of the imaging detector and the diffraction element is fixed to the inner wall of the tubular structural element outside the imaging detector, so that the diffraction element is fixed below the imaging detector.

A phase detection method for a wafer-level optical element is provided, and the method is applied to the phase detection device, when a wafer-level optical element is mounted to a carrier of the displacement platform, along the direction of the optical path the phase detection device includes: a light source, a beam collimator, a filter, a wafer-level optical element, a diffraction element and an imaging detector;

when a light is incident to the wafer-level optical element, the radius of the light coverage area is greater than or equal to a radius of each sub-optical element, and is less than or equal to the distance between the edge and the center of each wafer-level optical element;

a plurality of edge sub-optical elements at the edge of the wafer-level optical element are pre-calibrated;

the method includes:

when the reset of the carrier is completed and the wafer-level optical element is mounted on the carrier, controlling the movement of the carrier until the interference image corresponding to the edge sub-optical elements is detected and obtained;

correcting a position of the carrier by setting a target that a center deviation between the interference image of the edge sub-optical element and an image of the imaging detector is less than a pre-set threshold, so as to make the wafer-level optical elements at an initial target attitude and an initial target position;

when the correction of the carrier is completed, the carrier is controlled to sequentially move each sub-optical element of the wafer-level optical element to a position at the center of the imaging detector to perform a phase detection of the sub-optical elements based on the corresponding interference image of the sub-optical elements.

In one embodiment, along the direction of the optical path, there is an aperture slot set on the optical path between the light source and the optical element, and the wafer-level optical element includes optical elements with two kinds of radius;

the method further includes: when the interference images read a command, determining a target sub-optical element corresponding to the interference image to be read, and adjusting the aperture of the aperture slot based on the distance between the target sub-optical element and the adjacent sub-optical element, so that the radius of the spot on the wafer-level optical element is greater than or equal to the radius of the target sub-optical element, and less than or equal to the distance between the center of the target sub-optical element and the edge of the adjacent sub-optical element.

In one embodiment, there is an aperture slot set on the optical path and is between the light source and the optical element, and each sub-optical element has the same radius;

the method further includes: when the wafer-level optical element is mounted on the carrier, adjusting the aperture of the aperture slot according to the radius of each sub-optical element and the distance between each sub-optical element and adjacent sub-optical element, so as to make the radius of the spot that the lights projects on the wafer-level optical element greater than or equal to the radius of the sub-optical element, and less than or equal to the distance between the center of the sub-optical element and edge of the adjacent sub-optical elements.

The phase detection device for the wafer-level optical element provided by the present application includes: a plurality of edge sub-optical elements at the edge of the wafer-level optical element are pre-calibrated; when the reset of the carrier is completed and the wafer-level optical element is mounted on the carrier, controlling the movement of the carrier until the interference image corresponding to the edge sub-optical elements is detected and obtained; correcting a position of the carrier by setting a target that a center deviation between the interference image of the edge sub-optical element and an image of the imaging detector is less than a pre-set threshold, so as to make the wafer-level optical elements at an initial target attitude and an initial target position; when the correction of the carrier is completed, the carrier is controlled to sequentially move each sub-optical element of the wafer-level optical element to a position at the center of the imaging detector to perform a phase detection of the sub-optical elements based on the corresponding interference image of the sub-optical elements. In the present application, the diffraction element is set according to this method to make the diffraction element emit a plurality of first-order diffracted lights that the shearing interference will happen to. Because shearing interference has a very low requirement for the coherence of light, the shearing interference will even happen to incoherent lights. In the present application, the lights emitted by the light source have a very low coherence, the diffracted lights emitted from the diffraction element can produce enough interference. Therefore, the embodiment of this application avoids the light emitted by the light source mustn't have extremely high coherence, which will avoid the production of noisy speckles in the interference image and improve the accuracy of phase detection.

The phase detection method for the wafer-level optical element provided by the present application pre-calibrates the edge optical elements of the wafer-level optical element. After the carrier completing the reset and the wafer-level optical element is mounted on the carrier, the interference images of the edge optical elements can be detected and obtained from the interference images recorded by the imaging detector effectively. Therefore, the position of the carrier can be corrected accurately and the position deviation produced during the detection process based on a central deviation between the interference images of the pre-calibrated edge sub-optical elements and the images of the imaging detector. In this way, the wafer-level optical element is at the initial target position and the initial target attitude, and the sub-optical element that images recorded by the imaging detector corresponds to will be identified. Therefore, the wafer-level optical element is completed accurately and effectively after completing the correction of the position of carrier.

In order to make the above purposes, features and advantages of the disclosure more obvious and understandable, the embodiment is given below and illustrated in detail with the attached drawings.

It should be understood that the above general description and the following detailed description are exemplary only, and do not limit this application.

BRIEF DESCRIPTION OF THE DRAWINGS

The present disclosure may be better understood by reference to the description given below in combination with the drawings, where the same or similar drawing markings are used in all the drawings to represent the same or similar assemblies. The drawings are included in the specification along with the following detailed description and form part of the specification, and to further illustrate the preferred embodiments of the disclosure and explain the principles and advantages of the disclosure.

DETAILED DESCRIPTION OF DISCLOSURED EMBODIMENTS

Figure 1:
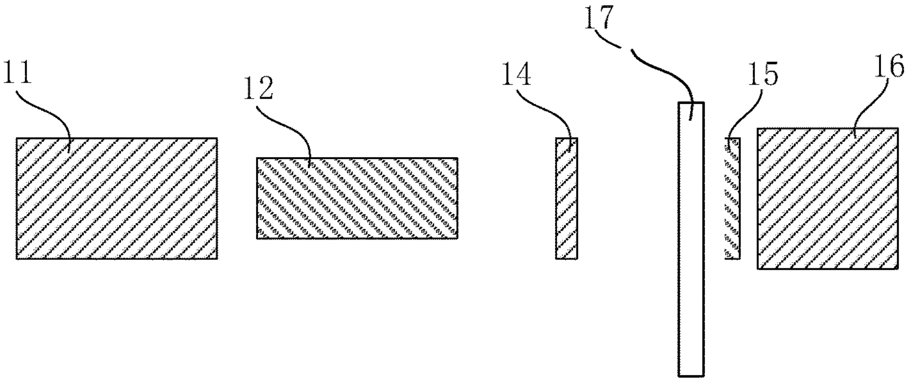
FIG. 1 shows a layout diagram of a phase detection device for an optical element in one embodiment of the present application.

The exemplary embodiment will be described more comprehensively with reference to the accompanying drawings. However, the exemplary embodiments can be implemented in various forms and should not be understood to be limited to the examples elaborated herein; instead, providing these exemplary embodiments makes the description of this application more comprehensive and complete and fully communicates the idea of the exemplary embodiment to those skilled in the art. The attached drawings are only schematic illustrations of this application and are not necessarily proportional drawings. The same reference marks in the figure indicate the same or similar parts, and their repeated descriptions will be omitted.

Furthermore, the described features, structures or features may be combined in one or more exemplary embodiments in any suitable manner. In the following description, many specific details are provided to give a full understanding of the exemplary embodiments of this application. However, those skilled in the art will be aware that the technical solution of the application may be practiced without one or more of the specific details, or other methods, groups, steps and the like may be adopted. In other cases, the aspects of the present application are blurred without a detailed showing or describing the public structure, method, implementation, or operation to avoid over-dominance.

Some of the box diagrams shown in the accompanying drawings are functional entities and do not necessarily have to correspond to physically or logically separate entities. These functional entities can be implemented in the form of software, either in one or more hardware modules or integrated circuits, or in different networks and/or processing unit devices and/or micro-controlled devices.

In the present application, the sub-optical elements refer to the optical elements integrated on one piece of wafer. In the relevant technology, based on the principle of off-axis interference, a phase detection device for the wafer-level optical element is provided. The phase detection device for the optical element in the relevant technology divides the lights emitted by the light source into two optical paths: the first optical path and the second optical path. The optical element to be detected is set on the first optical path, and the lights of the first optical path have the information of the phases of the optical elements. The second optical path has the wavefront modulation assembly, and the wavefront modulation assembly modulates the type of wavefront of the second optical path into the same type of wavefront of the optical element. The lights of the first optical path and the second optical path finally collimate together and generate the interference, and the imaging detector images the interference lights and records the interference image. The phase information of the sub-optical element is extracted by the interference image. Thus, the phases corresponding to the sub-optical elements are determined.

It should be noted that to ensure the information of phases of the sub-optical element extracted by the interference image, the interference generated by the lights is enough. And if the phase detection device in the relevant technology needs to make sure the interference generated by lights is enough, there are two ways to adopt: (1) Ensuring the difference between the first optical path and the second optical path is within the coherence length. But due to the first optical path and the second optical path all need to set various kinds of sub-optical elements, in practice, the operation of this way is very difficult, and basically do not have operation ability. (2) A light source with extremely high coherence is used, and the light interference generated by the light emitted by the light source with extremely high coherence to make the difference between the first optical path and the second optical path is not within the range of coherence length, and the interference generated by the lights is also enough.

However, once the light emitted by the light source is extremely coherent, it is easy to generate noisy speckles in the interference image. The presence of noisy speckles will interfere with the process of extracting the information on the phase of the optical element from the interference image, which will lead to the accuracy of phase detection decreasing.

Thus, the phase detection device provided by the related technology has the following defects: in order to ensure that the interference is enough, a light source with high coherence has to be used to make the light emitted light with high coherence, and the noisy speckles are introduced into the interference image and the accuracy of phase detection decreases.

To overcome the above defects in the relevant technology, a phase detection device for an optical element is provided. In the phase detection device, even if the lights emitted by the light source are incoherent lights with very low coherence, the interference generated by the lights is enough. Thus, the noisy speckles avoid being introduced into the interference image and the accuracy of phase detection improves.

FIG. 1 shows a layout diagram of the phase detection device for the optical element. As shown in FIG. 1, in the phase detection device provided by the present application, along the optical path the device includes: a light source 11, a beam collimator 12, a filter 14, a diffraction element 15 and an imaging detector 16.

Specifically, the light source 11 is used to emit lights at the target waveband. The target waveband matches the working waveband of the sub-optical element to be detected. For example, if the sub-optical element to be detected works at the far-infrared waveband, the light source 11 is used to emit the far-infrared waveband; if the sub-optical element to be detected works at the visible light waveband, the light source 11 is used to emit the light at the visible waveband; similarly, the waveband of the lights emitted by the light source 11 in other situations will not be repeated here.

The lights emitted by light source 11 are incident to the beam collimator 12, and the beam collimator 12 collimates the lights emitted by the light source 11, thus the outgoing lights are parallel lights. The beam collimator 12 may be a reflective collimator, or may be a collimating lens, or also may be a collimating lens group composed of multiple collimating lenses. And the collimating lens may be a metalens, or may be a micro-lens. Because the dispersion will be generated when the collimating lens or the collimating lens group collimates the lights, preferably, the beam collimator 12 is a reflective collimator.

The parallel lights emitted by light source 11 are incident to the filter 14, and the filter 14 filters the lights outside the target waveband. Thus, the parallel lights at the target waveband are filtered and obtained.

The parallel lights at the target waveband are incident from the filter 14 to the diffraction element 15, and the diffracted lights are obtained through the diffraction element 15.

The diffracted lights are incident to the imaging detector 16 and the imaging detector 16 images the diffracted lights and generates the interference image.

In order to perform a phase detection on the sub-optical element to be detected 17, the sub-optical element to be detected is set on the optical path between the filter 14 and the diffraction element 15. In this way, the lights emitted by the light source 11 are collimated into parallel lights by the beam collimator 12, and the parallel lights are filtered to be parallel lights at the target waveband. The parallel lights pass through the optical element 17 and are applied to phases, and the parallel lights with the phase information of the sub-optical element 17 are diffracted when they pass through the diffraction element 15. The diffracted lights are imaged and recorded by the imaging detector 16, so that the interference image contains the phase information of the sub-optical element 17.

The phase detection device further includes a process, and the process and the imaging detector 16 are communicatively connected (including the wireless communication connection or the wired communication connection). The interference image including sub-optical element 17 contains the phase information and the diffraction effect of the diffraction element 15 is certain, that is, the interference method of diffracted lights is certain. So when the process obtains the interference image, the phase information of the sub-optical element 17 will be extracted by the interference method, and the phase corresponding to the sub-optical element 17 can be determined.

As described above for the defects of the relevant technology, to improve the accuracy of phase detection, the interference generated by the lights is enough even if the light source is an incoherent light with a very low coherence. In the present application, the optical path the phase-detection device includes: a light source 11, a beam collimator 12, a diffraction element 15 and an imaging detector 16; the optical element to be detected 17 is set between the filter 14 and the diffraction element 15; the diffraction element 15 includes a mesh mask region and an array region segmented by the mesh mask region; the mesh mask region is used to block lights of a target wavelength; the array region includes a first class of cell and a second class of cell, and the first class of cell and the second class of cell are alternatively arranged; the first class of cell is used to provide a first phase for the lights of the target wavelength, and the second class of cell is used to provide a second phase for the lights of the target wavelength; a phase difference between the first phase and the second phase is π rad; the phase detection device further includes a process; the process is communicatively connected to the imaging detector 16 to determine a phase corresponding to the optical element according to an interference image recorded by the imaging detector 16.

In the present embodiment, the diffraction element 15 is configured as this method, and the diffraction element 15 will emit multiple first-order diffracted lights. There will be a shearing interference phenomenon between the multiple first-order diffracted lights. It should be noted that shearing interference requires lights with low coherence, and even if the incoherent lights will generate shearing interference. Therefore, in the embodiment of the present application, even if the lights generated by the light source 11 are incoherent lights with low coherence, the diffracted lights emitted by the diffraction element 15 will generate an enough interference. And the phase detection device provided by the present application avoids having a light source with extremely high coherence, and the interference image avoids having noisy speckles. In this way, the accuracy of the phase detection improves.

Figure 2:
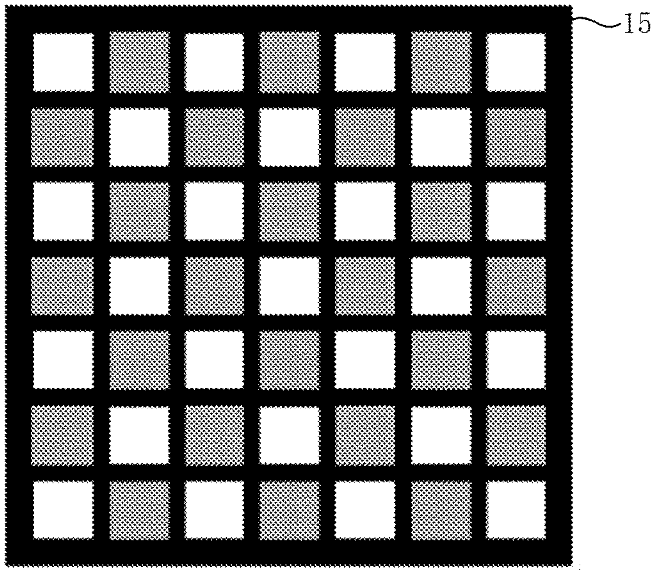
FIG. 2 shows a schematic configuration of the diffraction element in one embodiment of the present application.
Figure 3:
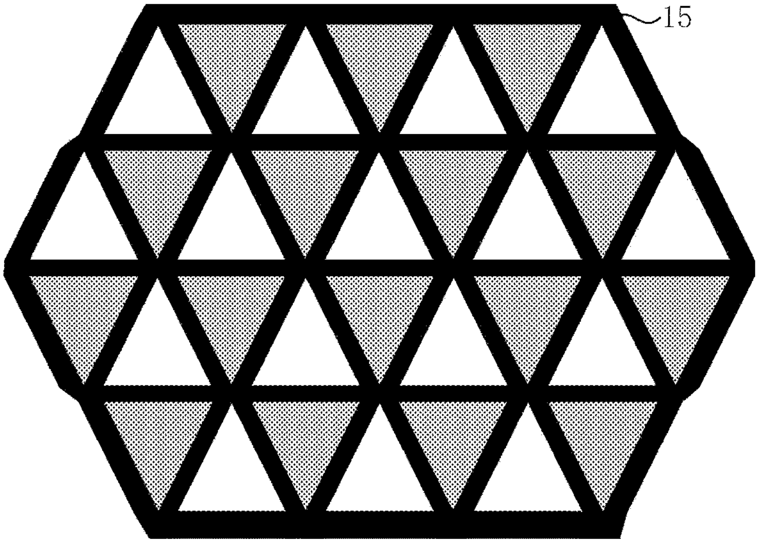
FIG. 3 shows a schematic configuration of the diffraction element in one embodiment of the present application.

In detail, FIG. 2 illustrates a schematic diagram of the diffraction element 15 in an embodiment of the present application. FIG. 3 illustrates a schematic structural view of the diffraction element 15 in another embodiment of the present application. As shown in FIG. 2 and FIG. 3, the black regions represent the mesh mask regions, and the white regions and the gray regions represent the array regions segmented by the mesh mask regions. The white regions may be recorded as the first class of cells, and the gray regions may be recorded as the second class of cells. Alternatively, the white regions may be recorded as the second class of cells, and the gray regions may be recorded as the first class of cells.

In the corresponding embodiment of FIG. 2, the cells in the array region of the diffraction element 15 are rectangular; in the corresponding embodiment of FIG. 3, the cells in the array region of the diffraction element 15 are triangular. As shown in FIG. 2 and FIG. 3, the first class of cells and the second class of cells are alternatively arranged. And the first class of cells are used to provide a first phase for the lights of the target wavelength, and the second class of cells are used to provide a second phase for the lights of the target wavelength; a difference between the first phase and the second phase is $\pi$ rad. For example, the white regions corresponding to the cells provide the phase of $\varphi$ rad for the lights at the target wavelength, and the gray regions corresponding to the cells provide the phase of $(\varphi+\pi)$ rad for the lights at the target wavelength. The white regions corresponding to the cells provide the phase of $(\varphi-\pi)$ rad for the lights at the target wavelength, and the gray regions corresponding to the cells provide the phase of Y rad for the lights at the target wavelength.

It should be noted that the diffracted lights may be divided into multiple diffracted lights according to the diffraction orders—0-order diffracted light, first-order diffracted light, second-order diffracted light, third-order diffracted light, and so on. In the embodiment of the present application, the setting of the mesh mask region is able to eliminate the diffracted light (including second-order diffracted light). And the setting of the array region is able to eliminate the even-order diffracted light (including 0-order diffracted light, and second-order diffracted light). In this way, the diffraction element 15 obtained from the combination of the mesh mask region and the array region can eliminate the diffracted light above second-order and even orders, so that the emitted diffracted light contains only first-order diffracted light.

Figure 4:
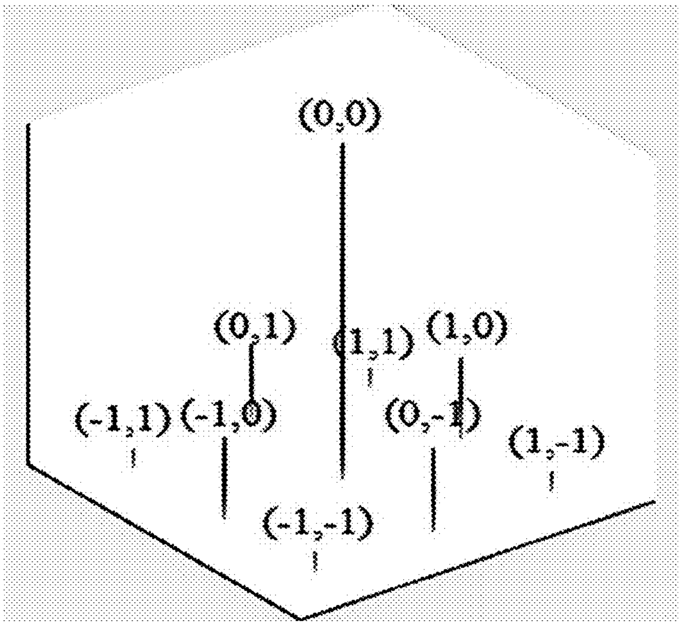
FIG. 4 shows a schematic diagram of the distribution of diffracted light obtained from the mask region in the diffraction element shown in FIG. 2 in one embodiment of this application.
Figure 5:
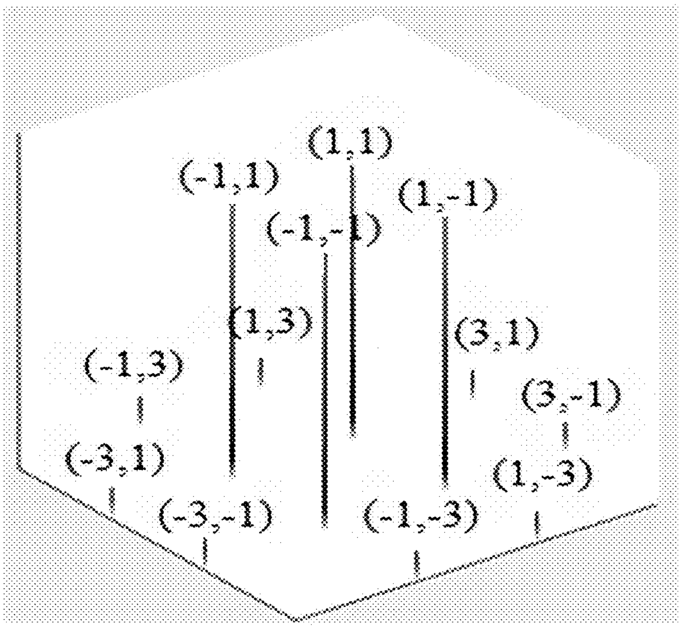
FIG. 5 shows a schematic diagram of the distribution of diffracted light obtained from the array region of the diffraction element shown in FIG. 2 in one embodiment of this application.
Figure 6:
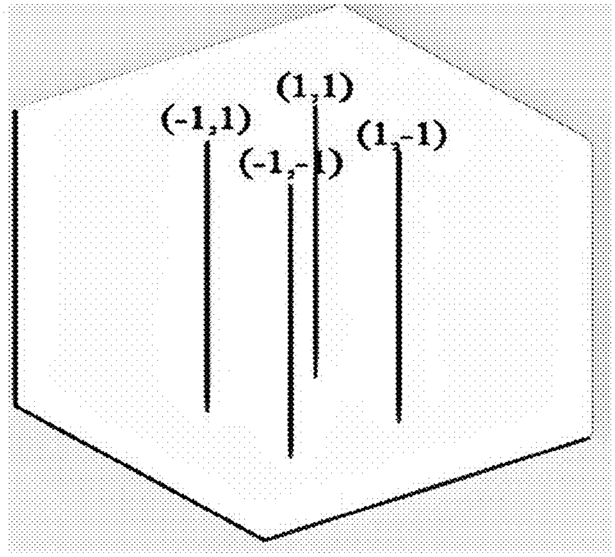
FIG. 6 shows a schematic diagram of the distribution of the diffracted light obtained from the diffraction element shown in FIG. 2 in the one embodiment of this application.

FIG. 4 shows a schematic diagram of the distribution of diffracted light obtained from the mesh mask region of the diffraction element 15 shown in FIG. 2 in an embodiment of this application. FIG. 5 shows a schematic diagram of the distribution of diffracted light obtained from the array region of the diffraction element 15 shown in FIG. 2 in an embodiment of this application. FIG. 6 shows a schematic diagram of the distribution of diffracted light obtained from the diffraction element 15 shown in FIG. 2 in one embodiment of this application. From FIG. 4 to FIG. 6, the line segments with coordinates represent the diffracted lights, while the coordinates represent the 2D diffraction orders of the corresponding diffracted lights.

As shown in FIG. 4, if only the mesh mask regions in the diffraction element 15 shown in FIG. 2 are provided, the emitted diffracted lights have only 0-order diffracted light and first-order diffracted light: (0,0), (0,±1), (±1,0), (±1, ±1). As shown in FIG. 5, if only the mesh mask regions in the diffraction element 15 shown in FIG. 2 are provided, the emitted diffracted lights have only first-order diffracted light and third-order diffracted light: (±1, ±1), (±1, ±3), (±3, ±1); it should be noted that other odd-order diffracted lights that is greater than 3 orders hasn't been generated in FIG. 5 due to the period of the array regions. As shown in FIG. 6, the diffracted lights emitted by the diffraction element 15 shown in FIG. 2 have only four first-order diffracted lights by combining the mesh mask regions with the array regions: (±1, ±1).

As shown in FIG. 2, the diffraction element 15 obtains four first-order diffracted lights, and the four of the diffracted lights propagate along the respective diffraction direction, then the four of the diffracted lights will be imaged at the imaging detector 16. When the four kinds of first-order diffracted lights are imaged, the shearing interference occurs between the diffracted lights of the symmetrical orders, which will be recorded as a corresponding interference image by the imaging detector 16.

In one embodiment, the diffraction element 15 is a hybrid grating, and the hybrid grating includes a mesh mask grating and a 2D array grating; in the 2D array grating, a height difference between the first class of cell and the second class of cell is $\lambda/2(n-1)$; $\lambda$ is a target wavelength, n is a refractive index of the 2D array grating at the target wavelength.

Specifically, the refractive index of the 2D grating at the target wavelength is n, and the refractive index of air is 1. Therefore, the difference between the refractive index of the 2D grating and the refractive index of air is n−1.

In general, the 2D array grating is made of silicon. Because the high reflective index of the interface between silicon and air will lead to a decrease in the transmittance of lights, an antireflection film is coated on one surface of the 2D array grating to improve the transmittance of lights in one embodiment. And the surface of the 2D array grating is facing toward an incident light.

Further, the difference between the optical path of the first class of cells and the optical path of the second class of cells at the target wavelength is equal to the product of the difference of the refractive index n−1 and the height difference between the first class of cells and the second class of cells $\lambda/2(n-1)$, that is, the difference of the optical path is $\lambda/2$.

Furthermore, the difference between the first phase and the second phase is equal to the product of the difference of the optical path $\lambda/2$ and $2\pi/\lambda$, that is, $\pi$ rad.

In one embodiment, the optical track of the phase detection device provided by the present application is a straight line. As shown in FIG. 1, in the present embodiment, the light source 11, the beam collimator 12, the filter 14, the diffraction element 15, and the imaging detector 16 are arranged in order of a straight line.

Figure 7:
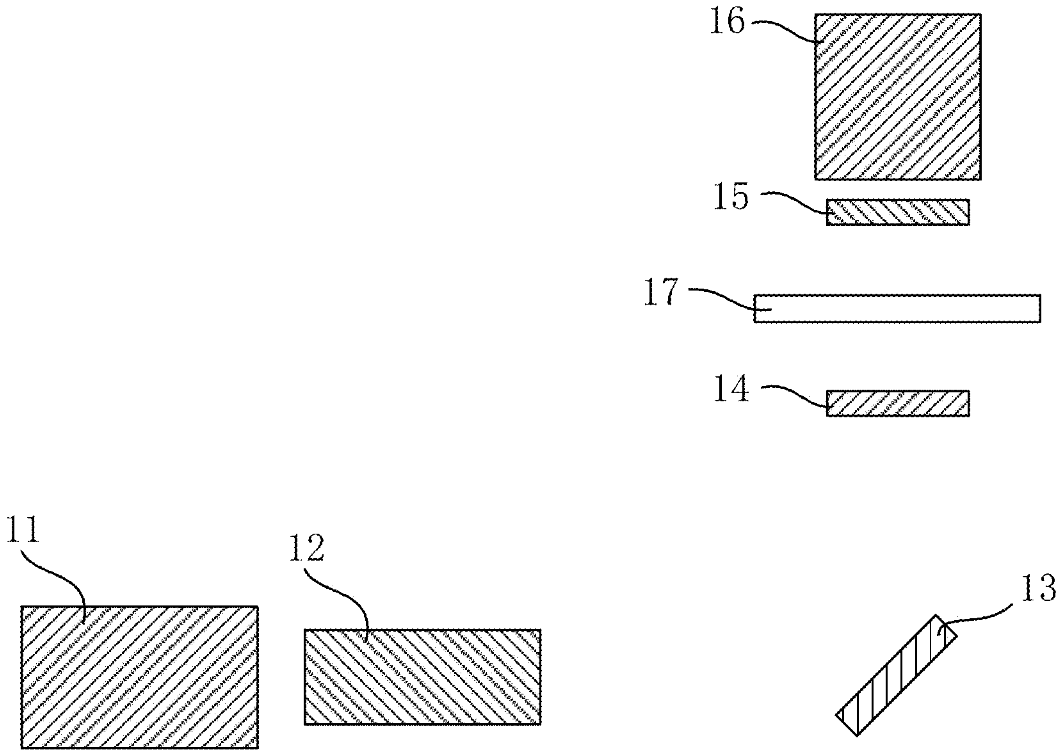
FIG. 7 shows a layout diagram of a phase detection device in one embodiment of the present application.

FIG. 7 illustrates a layout architecture diagram of the phase detection device for an optical element in one embodiment of the present application. As shown in FIG. 7, in one embodiment, the length of the light source 11 and the length of the beam collimator 12 are generally larger. If the light source 11, the beam collimator 12, the filter 14, the diffraction element 15, and the imaging detector 16 are arranged in a straight line along the optical path, the length of the whole phase detection device will be too larger. Therefore, a beam steering device is set between the beam collimator 12 and the filter 14 along the optical path, and the beam steering device is used to deflect the light propagation direction. And the beam steering device 13 may be a reflecting mirror or a turning prism.

It should be understood that the beam steering device is used to deflect the optical path, so the embodiment may reduce the length of the whole phase detection device by avoiding the light source 11, the beam collimator 12, the filter 14, the diffraction element 15 and the imaging detector 16 arranging in a straight line. In this way, the space occupied by the phase detection device can be saved.

In one embodiment, to ensure the imaging quality of the interference image, the distance between the diffraction element 15 and the imaging detector 16 is controlled to be greater than or equal to 1 mm and less than or equal to 5 cm. Preferably, the distance between the diffraction element 15 and the imaging detector 16 is controlled to be greater than or equal to 1 mm and less than or equal to 10 mm.

Figure 8:
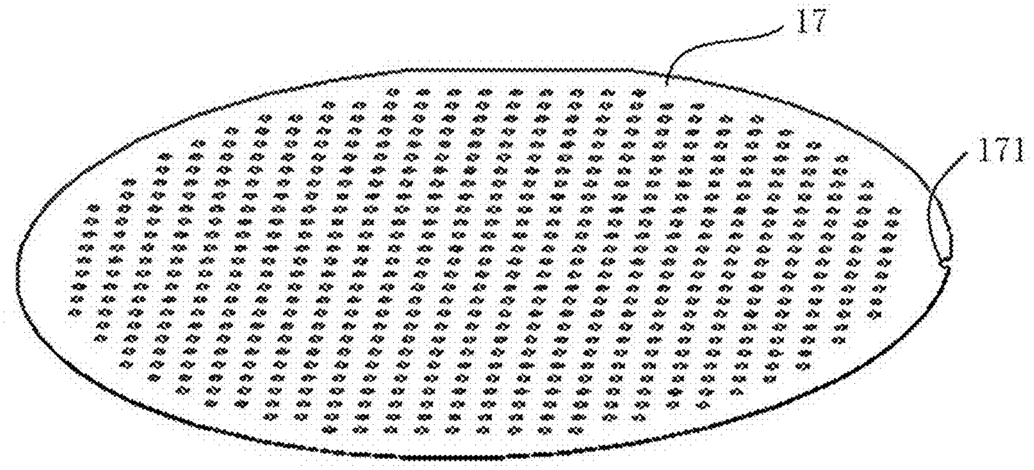
FIG. 8 shows a schematic diagram of the wafer-level optical element in one embodiment of the present application.

In one embodiment, an optical element to be detected 17 may be a wafer-level optical element. FIG. 8 shows a schematic diagram of the wafer-level optical element 17 in one embodiment of the present application. As shown in FIG. 8, a plurality of sub-optical elements are processed once on a single wafer to obtain a whole piece of wafer-level optical element 17. That is, in the present application, a wafer-level optical element has integrated the plurality of sub-optical elements.

It should be noted that the wafer-level optical element 17 is usually shipped by the whole piece of wafer-level optical element completely, and it is difficult to cut each sub-optical element separately at shipment; however, a phase detection of each sub-optical element is required to fully detect the optical performance of each sub-optical element. Therefore, in this embodiment, it is necessary to comprehensively perform a phase detection of each of the sub-optical elements while ensuring the whole of the wafer-level optical elements 17.

Figure 9:
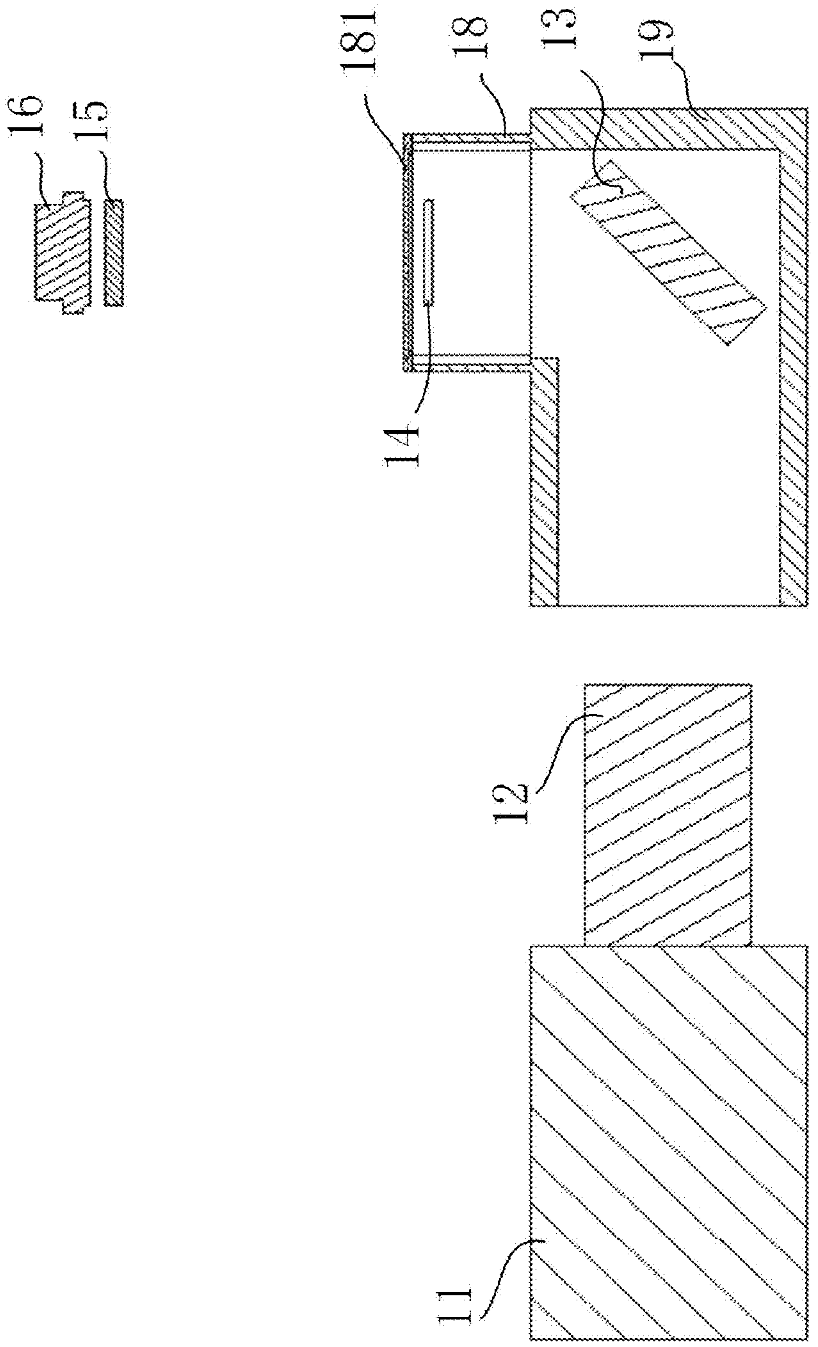
FIG. 9 shows a sectional view of the phase detection device in one embodiment of the present application.
Figure 10:
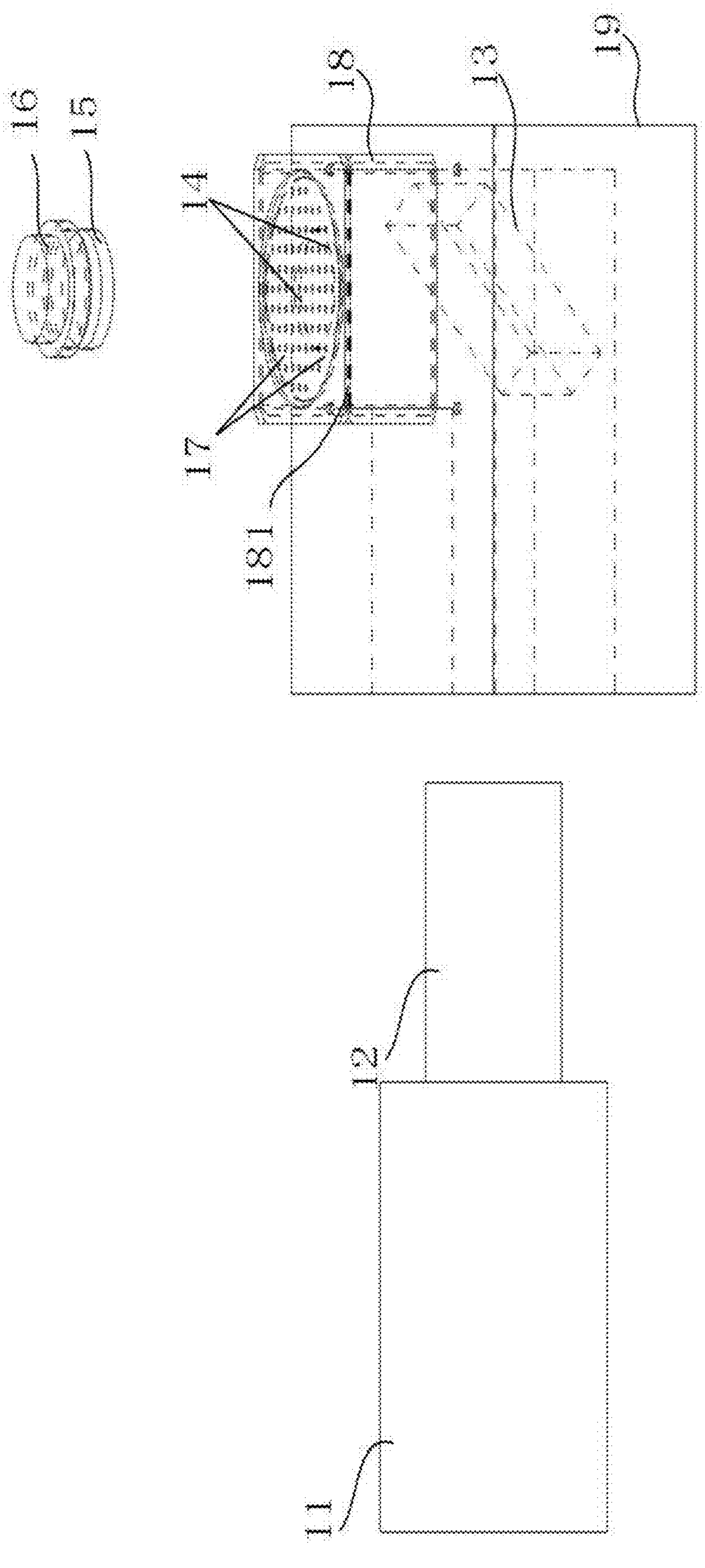
FIG. 10 shows a stereoscopic view of the phase detection device in one embodiment of the present application.

FIG. 9 shows a sectional view of the phase detection device in one embodiment of the present application. FIG. 10 shows a stereoscopic view of the phase detection device in one embodiment of the present application. As shown in FIG. 9 and FIG. 10, in order to ensure the integrity of the wafer-level optical element 17, a full phase detection device of each sub-optical element of the wafer-level optical element is performed. The phase detection device further includes a displacement platform 18 and a platform base 19. The phase detection device further includes: a displacement platform 18 and a platform base 19; a bottom surface of the displacement platform 18 is fixed to a top surface of the platform base 19; an open hole is set on the bottom surface of the displacement platform 18, and the open hole is through the platform base 19 simultaneously; an open end of the platform base 19 is set toward a side of the beam collimator; a cavity is set inside the platform base 19; a beam steering device 13 is set inside the displacement platform 18; the filter 14 is set on the optical path, and is between the beam collimator 12 and the top surface of the displacement platform 18; the carrier is a tray, and the tray is set on the top surface of the displacement platform 18, and the tray is capable of moving parallel to the top surface of the displacement platform 18; the tray is set on the optical path between the filter 14 and the diffraction element 15; the shape of the tray is a ring; a step structure is set along an inner wall of the tray; the wafer-level optical element 17 set on the tray by setting on the step structure; the displacement platform 18 includes a carrier. It should be noted that the open hole may mean that part of region of the displacement platform 18 is open, or may mean that the entire region of displacement platform 18 is open.

In the present embodiment, an open end of the platform base 19 is set toward a side of the beam collimator 12; namely, the platform base 19 is set toward a side of the beam collimator 12 to make the parallel lights collimated by the beam collimator 12 pass through the platform base 19. And a cavity is set inside the platform base 19; a beam steering device 13 is set inside the displacement platform. Therefore, after entering into the cavity of the platform base 19 from the open side of the platform base 19, the parallel lights collimated by the beam collimator 12 pass through the beam steering device 13 and are deflected by the steering device 13 to pass through the open hole of the top surface of the platform base 19 and the bottom surface of the displacement base 18. And the deflected lights achieve the displacement platform 18 and continue to propagate toward the top surface of the displacement platform 18.

In one embodiment, the top surface of displacement platform 18 is a displaced position of the target of wafer-level optical element 17. Therefore, the lights have been filtered with the lights except for the target wavelength, when the lights are incident to the wafer-level optical element 17. In the present embodiment, a filter 14 is set on the optical path between the beam collimator 12 and the top surface of the displacement platform base 18. In the present embodiment, the filter may be set inside the cavity of the displacement platform, and the filter may be vertically set over the open hole. In this way, the parallel lights in the cavity of the platform base 19 after being incident from the open hole to the cavity of the displacement platform 18 will be filtered out of the lights outside the wavelength of lights by the filter 14 and be incident to the wafer-level optical element 17 on the top surface of the displacement platform 18. Or the filter may be set inside the cavity of the displacement platform, and the filter may be vertically set below the open hole. In this way, the parallel lights in the cavity of the platform base 19 will be filtered out of the lights outside the wavelength of lights by the filter 14 and the lights will be incident to the cavity of the displacement platform 18 and be incident to the wafer-level optical element 17 on the top surface of the displacement platform 18.

In order to displace the wafer-level optical element 17, in the present embodiment, a tray 181 is set on the top surface of the displacement platform 18, and the tray 181 is capable of moving parallel to the top surface of the displacement platform 18; the tray 181 is set on the optical path between the filter 14 and the diffraction element 15; the shape of the tray 181 may be a ring. It should be noted that the tray 181 may be a ring means that the inner area of the tray 181 is empty, and it does not limit the shape of the tray 181. The shape of tray 181 is mainly dependent on the edge shape of tray 181, the shape of tray 181 may be a circular ring, a square ring, a triangular ring or other kinds of ring corresponding to other edge shapes.

It should be noted that the parallel lights filtered by the filter 14 of the target wavelength may pass through the inner region of the tray 181 by setting the tray 181 on the optical path between the filter 14 and the diffraction element 15 and setting the shape of tray as a ring. In this way, when the wafer-level optical element 17 is mounted on the tray 181, the parallel lights of the target wavelength are incident to the wafer-level optical element 17.

In order to ensure that the wafer-level optical element mounting on the tray 181 is steady, a step structure is set along the inner wall of the tray 181. The platform of the step structure can be supported by the wafer-level optical element 17. Thus, the wafer-level optical element 17 is mounted on the tray 181 through a platform mounting the step structure.

Therefore, in this embodiment, after the wafer-level optical element 17 is stably mounted on the tray 181, then the wafer-level optical element 17 is moved parallel to the top surface of the displacement platform 18 by controlling the tray 181 moving parallel to the top surface of the displacement platform 18, thus changing the sub-optical elements of the wafer-level optical element 17 when the lights of the target wavelength are incident. In this way, a full detection is performed on the sub-optical elements on the premise of ensuring the integrity of the wafer-level optical element 17.

In one embodiment, the wafer-level optical element includes a wafer-level metalens or a wafer-level grating.

In one embodiment, a plurality of step structures are set along the inner wall of the tray 181. In the present embodiment, the tray 181 may be compatible with placing various sizes of wafer-level optical elements 17 by setting multiple-step structures.

For example, along the inner wall of the tray 181, there are three step structures set on the inner wall of the tray 181, and the three step structures are a 12-inch step structure, 8-inch step structure and 6-inch step structure successively. So the tray 181 is compatible with placing wafer-level optical elements 17 of 12 inch, 8 inch and 6 inch.

Figure 11:
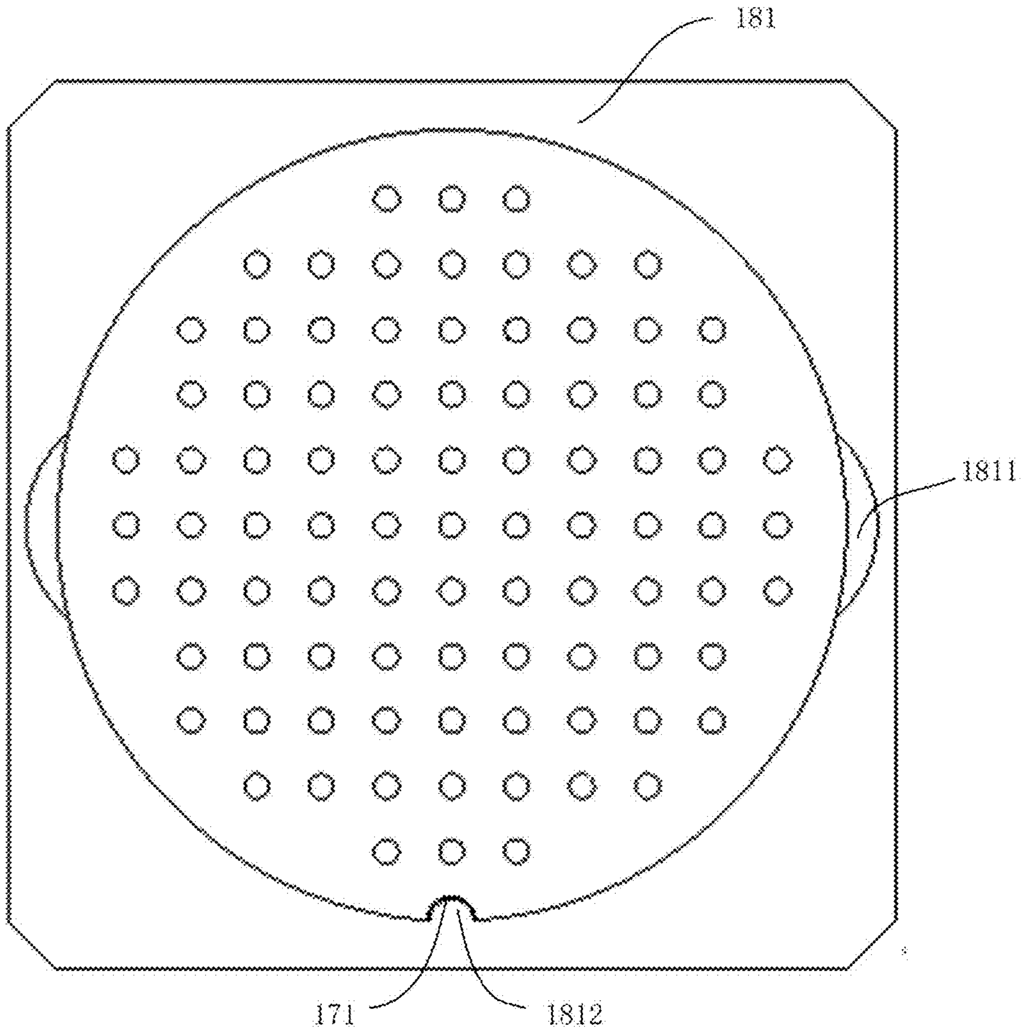
FIG. 11 shows a schematic configuration of the wafer-level optical element when mounted on the tray in one embodiment of this application.

FIG. 11 shows a schematic configuration of the wafer-level optical element 17 of the embodiment when the wafer-level optical element 17 are mounted on the tray 181. As shown in FIG. 11, in one embodiment, the inner wall of the tray 181 includes at least two ear structures 1811, and the two ear structures 1811 are convex to an outer wall of the tray 181.

Compared with the wafer-level optical element 17 mounted on the tray 181, the ear structures 1811 provides sufficient space for the sides of the wafer-level optical element 17 and other objects (e. g., a manipulator) to facilitate mounting the wafer-level optical element 17 on the tray 181 and also facilitating the removal of the wafer-level optical element 17 from the tray 181.

In order to allow the mounting of the wafer-level optical element 17 on the tray 181, the position of the wafer-level optical element 17 is determined and maintains its position remains unchanged during the movement of the tray 181. As shown in FIG. 8 and FIG. 11, in one embodiment, there is at least one notch structure 171 set on an edge of the wafer-level optical element 17. As shown in FIG. 11, there is at least one projection structure 1812 set on an inner wall of the wafer-level optical element.

When the notch structure 171 is only one and the protrusion structure 1812 also is only one, the size and the shape of the protrusion structure 1812 are configured to be the same as the notch structure 171, namely the protrusion structure 1812 is capable of embedding in the notch structure 171. It should understood, in this situation, when the wafer-level optical element is attached to the platform of the step structure, and the projection structure 1812 is embedded in the notch structure 171, the attitude of the wafer-level optical element 17 corresponding to the tray 181 will be determined in advance, and the attitude of the wafer-level optical element 17 will not change during subsequent phase detection due to movement of the tray 181.

When the notch structures 171 are multiple and the protrusion structures 1812 also are multiple, the distribution of protrusion structures 1812 is configured to match with the distribution of notch structures 171. And the size and shape of the protrusion structures are configured to match with the size and shape of the notch structures 171. In this way, each of protrusion structures 1812 can all match with the notch structures 171. It should understood, in this situation, when the wafer-level optical element is attached to the platform of the step structure, and the projection structures 1812 are embedded in the notch structures 171, the attitude of the wafer-level optical element 17 corresponding to the tray 181 will be determined in advance, and the attitude of the wafer-level optical element 17 will not change during subsequent phase detection due to movement of the tray 181. It should be noted that the number of notch structures 171 may be greater than or equal to the number of protrusion structures 1812; preferably, the number of notch structures 171 is equal to the number of protrusion structures 1812.

In one embodiment, the beam steering device 13 in the cavity of the platform base 19 may be a refractive mirror or a deviation prism.

It should be noted that when the lights are incident to the plurality of optical elements of the wafer-level optical element 17, the imaging detector 16 will record a plurality of interference images. And it is difficult to be determined accurately which sub-optical element each interference image corresponds to. Those diffracted lights generated by each of the sub-optical elements may interfere with each other, causing the difficulty of these recorded interference images to accurately reflect the phase of the corresponding sub-optical elements. Thus, in order to ensure the accuracy of phase detection, the diameter of the beam is controlled to ensure that there is only one sub-optical element is covered by the light coverage area.

It is further noted that in general, the sizes of the optical elements on one wafer-level optical element 17 are uniform, but the sizes of the sub-optical elements on the different wafer-level optical elements 17 may be different. Even in some special cases, the sizes of the sub-optical element on the one wafer-level optical element 17 may be different. Therefore, the phase detection device faces both the case of the sub-optical elements of different wafer-level optical element 17 and the sub-optical elements of different sizes on one wafer-level optical element 17 in order to ensure that when the beams are incident to the wafer-level optical element 17. There is only one sub-optical element covering the light coverage area, and the phase detection device needs to adjust the diameter of the beam before the beam is incident to the wafer-level optical element 17.

Figure 12:
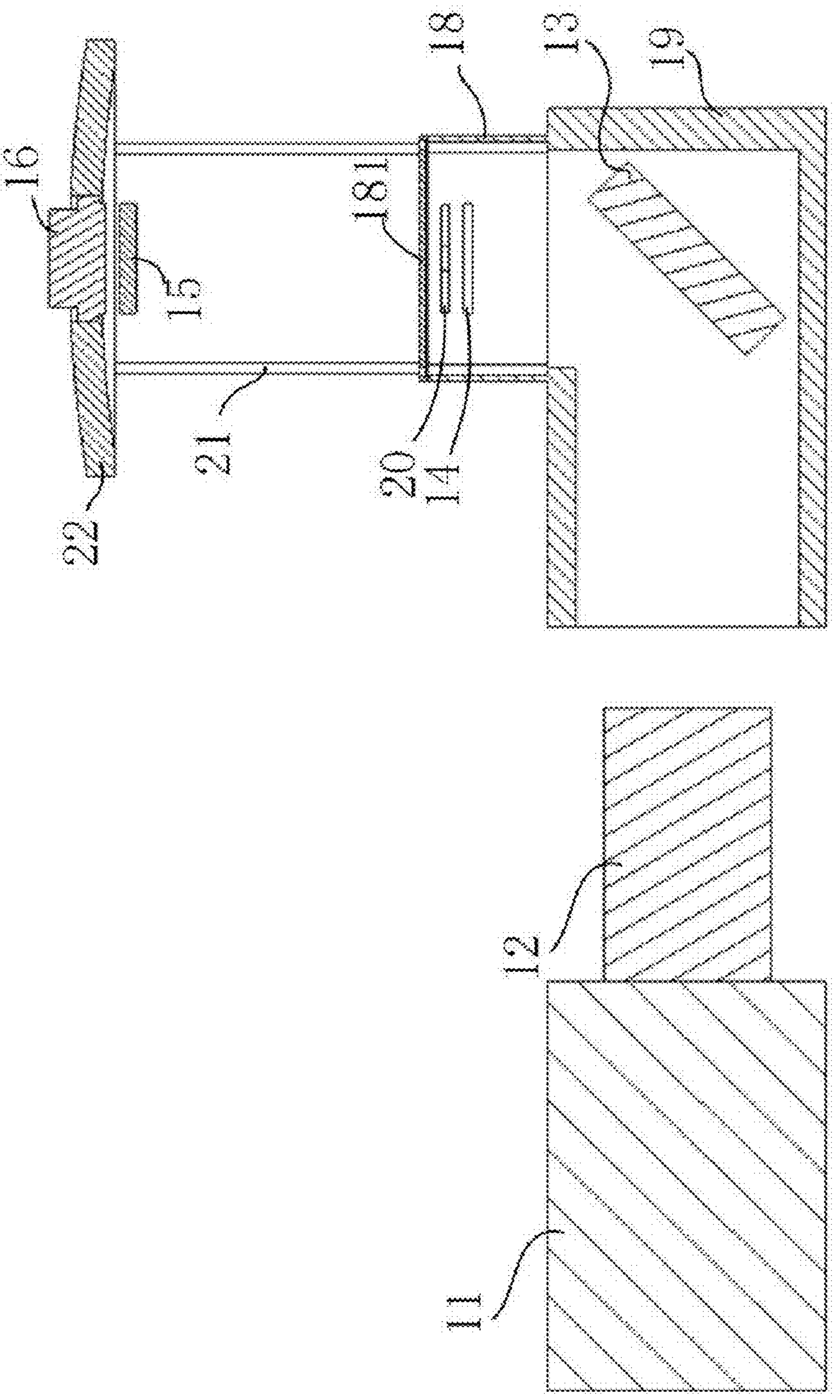
FIG. 12 shows a sectional view of the phase detection device in one embodiment of the present application.

In one embodiment, an aperture slot is set on the optical path between the beam collimator 12 and the tray 181. FIG. 12 shows a sectional view of the phase detection device in one embodiment of the present application. As shown in FIG. 12, the aperture slot 20 is set on the optical path between the filter 14 and the tray 181. It should be understood that the aperture slot 20 may be set on the optical path between the beam collimator 12 and beam steering device 13, or set on the optical path between the beam steering device 13 and the filter 14.

In the present embodiment, the diameter of beams can be adjusted by adjusting the aperture of the aperture slot. Thus, the phase detection device can ensure that the beam covers only one sub-optical element on the wafer-level optical element 17 when the beam is incident to the wafer-level optical element 17.

In one embodiment, the phase detection device further includes a bracket support, and the bracket support is set a side of the displacement platform 18; the bracket support includes a support; the imaging detector 16 is fixed to the support, and the imaging detector 16 is vertically facing toward the displacement platform; the diffraction element 15 is set below the imaging detector 16.

In one embodiment, a tubular structural element may be provided, and the tubular structural element has an inner wall of threads. And the outer wall of the imaging detector 16 has threads, and the tubular structural element is set on the outer wall of the imaging detector 16 by threads, and the tubular structural element may extend downward to the outer wall of the imaging detector 16. The diffraction element 15 is fixed to the inner wall of the tubular structural element outside the imaging detector 16, so that the diffraction element 15 is fixed below the imaging detector 16.

Figure 13:
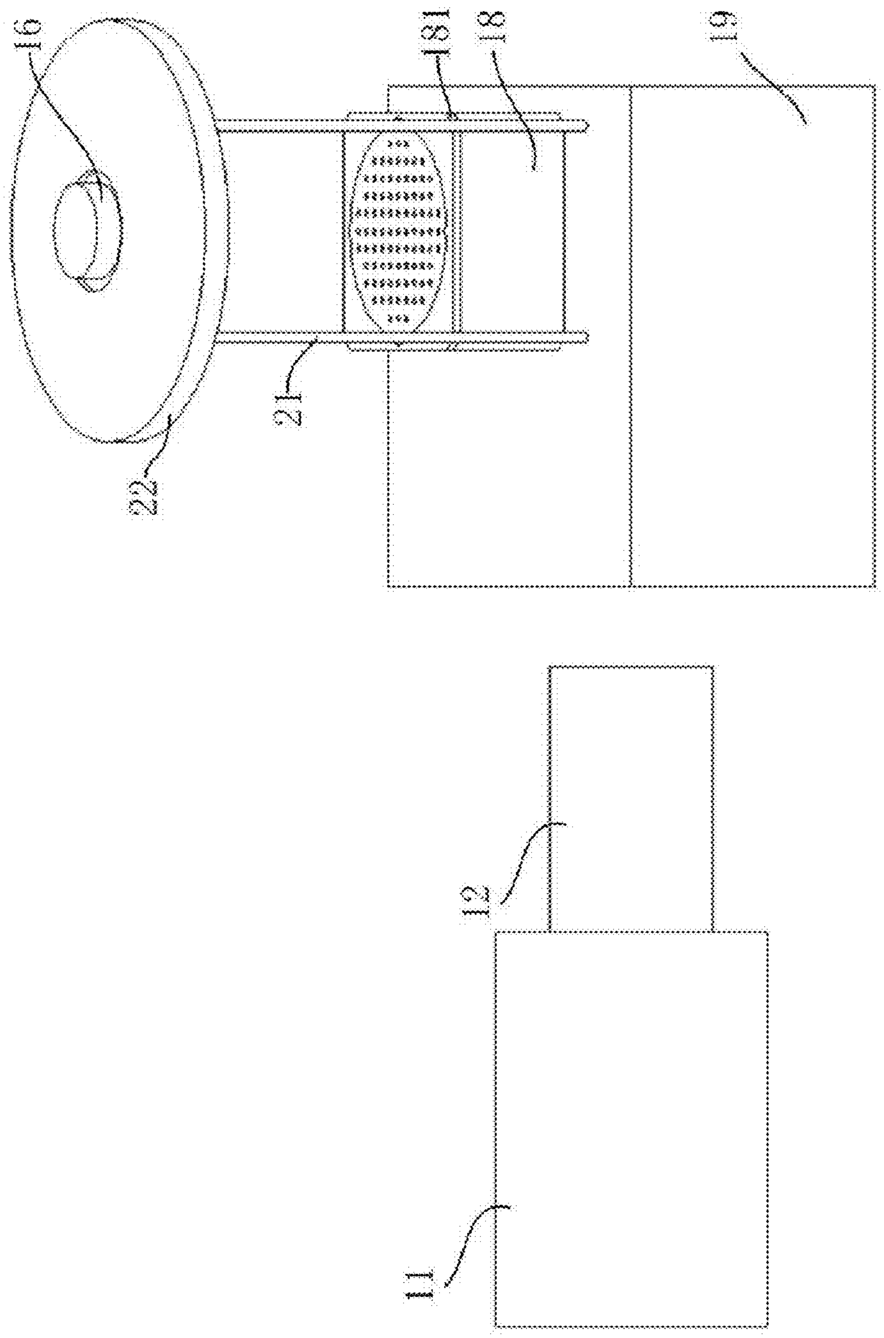
FIG. 13 shows a stereoscopic view of the phase detection device in one embodiment of the present application.

FIG. 13 shows a stereoscopic view of the phase detection device in one embodiment of the present application. Referring to FIGS. 12 and 13, in one embodiment, the bracket support includes a top surface of the bracket support fixed to the platform base 19 and at least three support rods 21; the bracket support is a dome bracket 22.

Therefore, in the present embodiment, the dome bracket 22 is set over the displacement platform 18 by the supporting of at least three support rods 21. And the imaging detector 16 is fixed to the center of the dome bracket 22, and the imaging detector 16 faces toward the displacement platform 18 vertically. It should be noted that the support rod 21 surrounded by displacement platform 18 is outside of the movement range of tray 181, which will avoid blocking the displacement of the tray 181.

In the present embodiment, a sub-bracket is set on the bottom surface of the dome bracket 22, and the sub-bracket extends downward. The diffraction element 15 is fixed to the center of the sub-bracket perpendicular to the imaging detector 16, thus the diffraction element 15 is fixed below the imaging detector 16.

It should be noted that FIG. 12 and FIG. 13 show the connection between "imaging detector 16 and diffraction element 15" and "displacement platform 18 and the platform base 19". It should be understood that in other embodiments, a support bracket may be set on the side of the platform base 19, and a connecting rod parallel to the ground may be set on the support bracket. The imaging detector 16 is fixed at the position vertically facing the displacement platform 18; further, the diffraction element 15 is fixed below the imaging detector 16 by the connecting rod or by the structural element of the imaging detector 16.

It should be understood, compared with the phase detection method in the prior art of "firstly cutting one wafer-level optical element into many independent optical elements, and then performing the phase detection for each sub-optical element separately", if the phase detection can be performed comprehensively on the integrity of the wafer-level optical element, the efficiency of phase detection will be significantly improved.

Therefore, the wafer-level optical element can be selected to be placed on the carrier of the displacement platform, and then drive the wafer-level optical element to move through the carrier, so as to comprehensively perform a phase detection on each sub-optical element on the premise of ensuring the integrity of the wafer-level optical element. However, to truly complete the phase detection of wafer-level optical element, it is not sufficient to detect the phase of each element alone; it is also essential to identify all detected elements clearly to determine which phase the sub-optical element corresponds to. However, in the wafer-level optical element, the area of a single sub-optical element and the distance between adjacent sub-optical elements are very small. Once a larger position deviation is produced, it is difficult to identify the detected sub-optical elements, and it is difficult to determine which phase obtained by detection the sub-optical element corresponds to. In this way, it will lead to the difficulty of completing the phase detection for the entire wafer-level optical element.

Therefore, to overcome the defects above, a phase detection method for a wafer-level optical element is provided by the present application, which will perform a phase detection for the wafer-level optical element accurately and efficiently.

In the present embodiment, in order to determine which phases the sub-optical elements correspond to, there is a phase detection device. Along the optical path, a phase detection device includes a light source 11, a wafer-level optical element, a diffraction element 15 and an imaging detector 16. In this way, when the lights emitted by the light source 11 pass through the wafer-level optical element 17, the sub-optical elements of the wafer-level optical element 17 apply corresponding phases to the lights; when the lights with the phase information of the sub-optical elements pass through the diffraction element 15, and the diffracted lights are produced at the diffraction element 15; next, the diffracted lights interfere with each other and are received by the imaging detector 16, and the imaging detector 16 obtains the corresponding interference images. The phase information in the interference image and the diffraction effect of the diffraction element 15 are certain, that is the interference method generated by the diffracted lights. The phase information corresponding to the lights can be extracted by combining the interference method and the obtained interference image, and the phase corresponding to each sub-optical element can be determined.

Further, a wafer-level optical element includes a plurality of optical elements, and each sub-optical element needs to be incident by lights to complete the phase detection according to the interference images of the imaging detector. Therefore, in the present application, the wafer-level optical element is mounted on the carrier of the displacement platform. In this way, the sub-optical elements of the wafer-level optical element incident by the lights will be changed with the movement of the carrier, each sub-optical element can complete the phase detection.

Furthermore, it should be understood that in order to obtain each phase of the sub-optical element, the complete interference image of each sub-optical element is required. Therefore, each sub-optical element needs to be covered with lights. And it should be understood that the imaging detector will record and obtain a plurality of interference images when lights are incident to the plurality of sub-optical elements of the wafer-level optical element. But the sub-optical element that the interference image corresponds to cannot be determined accurately. Those diffracted lights will interfere with each other, and it is more difficult for these interference images to reflect the phase of the corresponding sub-optical elements accurately.

Therefore, in order to ensure the accuracy of phase detection, it is not only necessary to ensure that the lights can fully cover each sub-optical element of the detection, but it also needs to ensure that the light coverage area will not overlap with the adjacent sub-optical element when the center of the light coverage area overlaps with the center of each sub-optical element of the target detection.

It should be noted that the carrier needs to be reset before the phase detection for the wafer-level element (the carrier may be reset before the phase detection; or the carrier may be reset when the carrier is mounted on the wafer-level element to be detected and the phase detection hasn't started) to ensure the carrier is at the pre-set initial target attitude and initial target position, thus the wafer-level optical element is at the pre-set initial target attitude and initial target position. In this way, all the sub-optical elements to be detected will be identified during the phase detection.

Specifically, the carrier is at the initial target attitude and the initial target position means the attitude and the position of the carrier when the formal initiation of the phase detection of the optical elements is started. In this way, during the subsequent phase detection, the corresponding sub-optical element for each interference image recorded by the imaging detector will be identified. Similarly, the wafer-level optical element at the initial target attitude and the initial target position means that the attitude and the position of the wafer-level optical element when the formal initiation of the phase detection of the sub-optical elements is started. In this way, during the subsequent phase detection, the corresponding sub-optical element for each interference image recorded by the imaging detector will be identified.

It is understandable that although the initial actual attitude of the carrier can usually be consistent with the initial target attitude of the carrier, there will be a certain deviation between the initial actual position and the initial target position due to the existence of mechanical error. As a result, although the initial actual attitude of the wafer-level optical element can be consistent with the initial target position after being mounted on the carrier, there is some deviation between the initial actual position of the wafer-level optical element and the initial target position. The area of each sub-optical element and the distance between adjacent sub-optical elements are very small. Once the detection produces a larger position deviation, even if the imaging detector records the interference image, it is difficult to determine which interference image the sub-optical element corresponds to. And it is difficult to identify the current detected sub-optical elements, thus it is difficult to determine which current-detected phase the sub-optical element corresponds to. Therefore, the entire wafer-level optical element is difficult to complete.

For example, if the detection doesn't have deviation, the wafer-level optical element is mounted on the carrier at the initial target position. And the sub-optical element A will directly face to the center of the imaging detector. Obviously, the interference images recorded by the imaging detector are determined to be the interference image of the sub-optical element A. If there are sub-optical elements B, C, and D surrounding the sub-optical element A, the area of each sub-optical element and the distance between each sub-optical element are smaller. Once a larger position deviation is produced, it may cause the imaging detector to record two interference images simultaneously, or to record only one interference image simultaneously. Because the degree and direction of the position deviation are uncertain, when the imaging detector records two interference images at the same time, the two interference images may be the interference images of A and B, the interference images of A and C, or the interference images of A and D. Similarly, when the imaging detector records only one interference image, this interference image may be an interference image of A or an interference image of B, C or D. It can be seen that once a larger position deviation is produced during the detection process, no matter how many interference images the imaging detector records, even if only one interference image is recorded, it is difficult to identify the currently-detected sub-optical elements. And it is difficult to determine which sub-optical element the interference image corresponds to.

In order to identify the detected sub-optical elements and to determine which sub-optical element the detected phase corresponds to when a larger position deviation is produced in the detection, a pre-calibration is performed on a plurality of edge sub-optical elements at the edge of the wafer-level optical elements in the embodiment. Since the relative position relationship between the edge sub-optical elements is more recognizable than the relative position relationship between the inner circumference sub-optical elements, the pre-calibrated edge sub-optical elements can be better identified.

For example, the sub-optical elements of the wafer-level optical element are arranged in a square array. The sub-optical element A is located at the upper right corner of the square array. The sub-optical element C is located at the lower left corner of the square array. Obviously, in the central connection between any two sub-optical elements, the central connection between the sub-optical elements A and C is unique. Therefore, even if the sub-optical element A and the optical element C are not identified in advance, if the central connection between the two edge sub-optical elements and the central connection between the sub-optical element A and C are the same, and the upper right sub-optical element is the sub-optical element A and the lower left sub-optical element is the sub-optical element C in the two edge sub-optical elements.

For example, the sub-optical elements of the wafer-level optical element are arranged in a square array. The sub-optical element A is located at the upper right corner of the square array. The sub-optical element B is located at the upper left corner of the square array. The sub-optical element C is located at the upper left corner of the square array. The sub-optical element D is located at the lower right corner of the square array. Obviously, the convex shape enclosed by any four sub-optical elements, the convex shape enclosed by the sub-optical elements A, B, C, and D is unique Therefore, even if the sub-optical elements of A, B, C, D are not identified in advance, as long as the convex shape enclosed by the four edge sub-optical elements is same as the convex shape enclosed by the sub-optical elements of A, B, C and D, and it can be determined that the upper right sub-optical element is the sub-optical element A, the upper left sub-optical element is the sub-optical element B, the lower left sub-optical element is the sub-optical element C, and the lower right sub-optical element is the sub-optical element D.

Since the pre-calibrated edge sub-optical elements are easier to be identified, the position of the reset carrier can be corrected more efficiently based on the edge sub-optical elements. Therefore, correcting the position deviation produced by the detection can make the wafer-level optical element is at the initial target attitude and initial target position. Thus, each currently detected sub-optical element is identified efficiently during the phase detection process, and the phase detection of the wafer-level optical element is completed efficiently and accurately.

Figure 14:
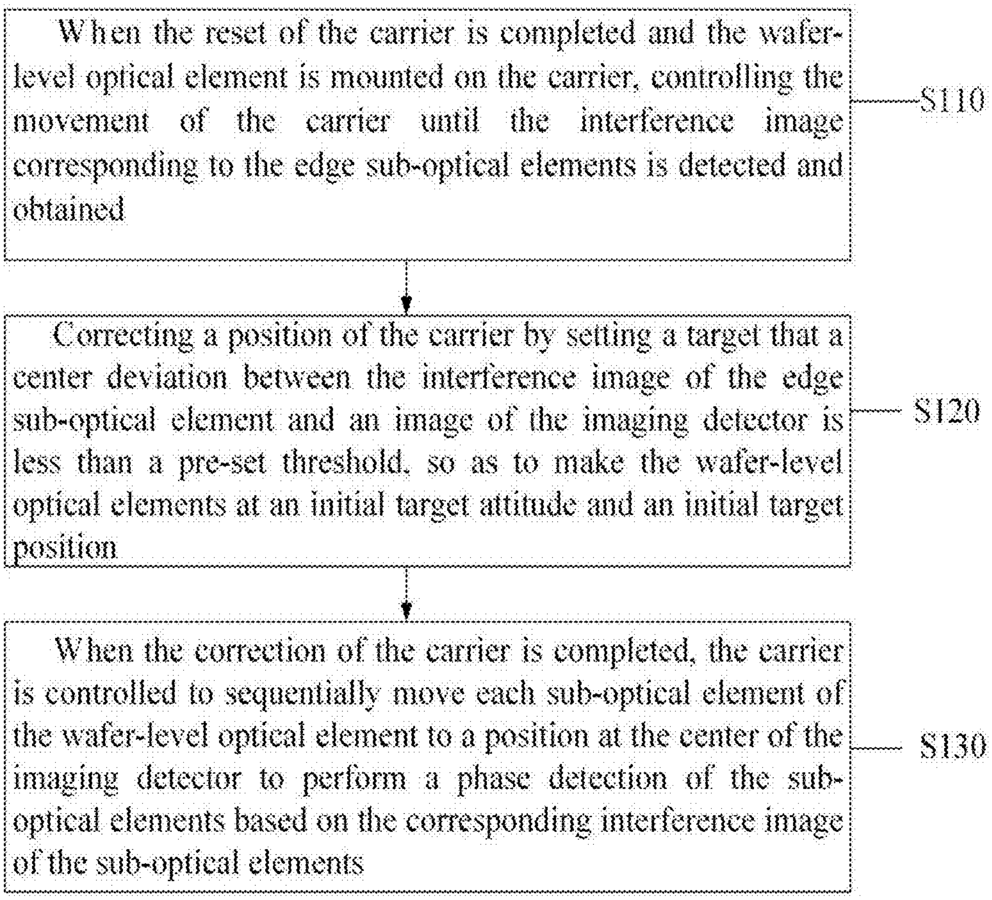
FIG. 14 shows a flowchart of a phase detection method for a wafer-level optical element in an embodiment of this application.

Therefore, a phase detection method for the wafer-level optical element is provided. FIG. 14 shows a flowchart of the phase detection method for the wafer-level optical element. As shown in FIG. 14, the method provided by the present application includes:

S110. when the reset of the carrier is completed and the wafer-level optical element is mounted on the carrier, controlling the movement of the carrier until the interference image corresponding to the edge sub-optical elements is detected and obtained;

S120. correcting a position of the carrier by setting a target that a center deviation between the interference image of the edge sub-optical element and an image of the imaging detector is less than a pre-set threshold, so as to make the wafer-level optical elements at an initial target attitude and an initial target position;

S130. when the correction of the carrier is completed, the carrier is controlled to sequentially move each sub-optical element of the wafer-level optical element to a position at the center of the imaging detector to perform a phase detection of the sub-optical elements based on the corresponding interference image of the sub-optical elements.

As mentioned above, the carrier of the displacement platform may be implemented by the tray in one embodiment. And the initial actual attitude of the carrier is usually consistent with its initial target attitude after reset. And when the wafer-level optical element is mounted on the carrier, the relative relationship between the wafer-level optical element and the carrier is confirmed. Therefore, when the wafer-level optical element is mounted on the carrier, the initial actual attitude and the initial target attitude are consistent. After the reset of the carrier and the wafer-level optical element mounted on the carrier being detected, the carrier is controlled to move. And the interference image corresponding to the edge sub-optical element may be selected according to the interference image recorded by the imaging detector. Since every time the distance and direction of the carrier movement are determined, the relative position relationship between the corresponding edge sub-optical elements of the selected interference image is determined at the initial target attitude of the wafer-level optical element. Since the relative position relationship between the pre-calibrated edge sub-optical elements is determined at the initial target attitude of the wafer-level optical element, the pre-calibrated edge sub-optical elements are identified by comparing the relative position relationship between the edge sub-optical elements corresponding to the selected interference image with the relative position relationship between the pre-calibrated edge sub-optical elements corresponding to the selected interference image.

While identifying and detecting the pre-calibrated edge sub-optical element, the interference image corresponding to the pre-calibrated edge sub-optical element can also be identified and detected. Therefore, the central deviation between the interference image corresponding to the pre-calibrated edge sub-optical element and the image of the imaging detector is determined, and then the central deviation being less than a pre-set threshold is set as a target. Specifically, and the carrier is controlled to move until the central deviation is less than the pre-set threshold.

Obviously, after completing the correction of the position of the carrier, the deviation of the position produced during the detection process is corrected. Therefore, in the subsequent phase detection, the sub-optical element corresponding to each interference image recorded by the imaging detector will be identified due to the attitude and the position of the carrier. Thus, each detected sub-optical element can be identified. It can be seen that after the correction of the position of the carrier, the carrier is at the initial target attitude and initial target position, and the wafer-level optical element is at the initial target attitude and initial target position.

Therefore, after correcting the position of the carrier, the carrier is controlled to move any sub-optical element facing to the center of the imaging detector based on the requirement. Then starting from the sub-optical element, each sub-optical element is performed an ergodic in order according to the planned path as the requirement. Obviously, each ergodic sub-optical element is an identified detection objection. The ergodic sub-optical element is moved by the carrier to the position facing to the center of the imaging detector, and the corresponding interference image is recorded by the imaging detector. Based on the recorded interference images, the ergodic phase corresponding to the sub-optical element is determined.

In summary, the phase detection method provided by the present application includes:

pre-calibrated a plurality of edge sub-optical elements at the edge of the wafer-level optical elements. After the reset of the carrier and the wafer-level optical element mounted on the carrier, the pre-calibrated edge sub-optical elements corresponding interference images are detected and obtained. The position of the carrier is corrected accurately based on the central deviation between the interference images of the pre-calibrated edge sub-optical element and the images recorded by the imaging detector. The position of deviation produced during the detection process is corrected, and the wafer-level optical element is at the initial target position and the initial target attitude. In this way, each interference image recorded by the imaging detector during the phase-detection process can be identified to the corresponding sub-optical element. Therefore, after completing the correction of the position of the carrier, the phase detection for the wafer-level optical element is completed accurately and effectively.

In one embodiment, the phase-detection is performed on the sub-optical element according to the interference images of each sub-optical element, and the method includes:

performing the Fourier transform on the corresponding interference image of each sub-optical element to obtain the spectrum diagram of each sub-optical element;

obtaining a first-order spectrum in the spectrum diagram by filtration, and performing the inverse Fourier transform on the first-order spectrum to obtain a distribution of an optical path difference of each sub-optical element;

calculating a phase distribution of each sub-optical element according to the distribution of the optical path.

Figure 15:
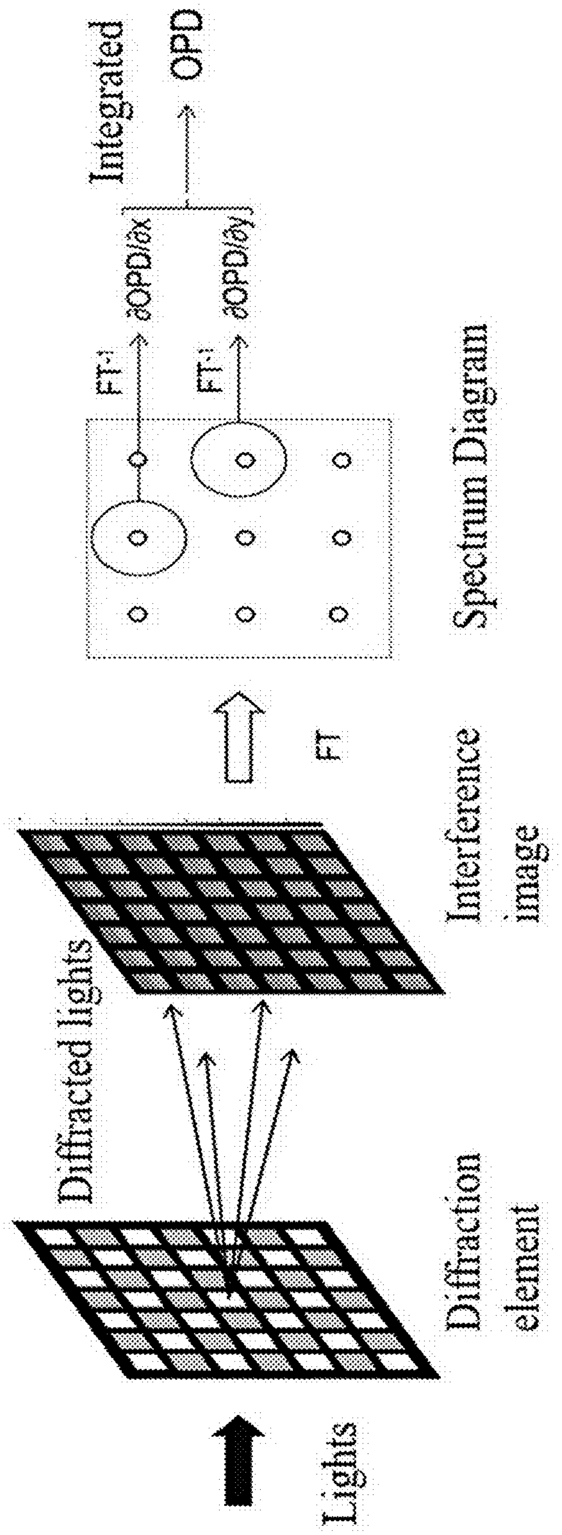
FIG. 15 shows a schematic diagram of the phase corresponding to the wafer-level optical element by the interference image in one embodiment of the present application.

Specifically, FIG. 15 shows a schematic diagram of determining the phase corresponding to the sub-optical element by the interference image in one embodiment of the present application. As shown in FIG. 15, in the present embodiment, when the lights with the phase information of the sub-optical element pass through the diffraction element, diffraction occurs to the lights at the diffraction element. And the diffracted lights interfere with each other, and the diffracted lights are received by the imaging detector. The imaging detector obtains the interference images. The Fourier transform is performed on the interference images to obtain the spectrum diagram of each sub-optical element. A first-order spectrum is obtained from the spectrum diagram by using a certain filtration, and the inverse Fourier transform can be performed on the first-order spectrum in the direction of X axis and Y axis at the same time to obtain the phase gradient distribution on the X axis ∂OPD/∂x and the phase gradient distribution on the Y axis ∂OPD/∂y. Then, the obtained phase gradient distributions are integrated to obtain the optical path difference OPD generated by the lights with the phase information of the sub-optical element when the lights pass through the diffraction element. Finally, the phase distribution of the sub-optical element is calculated by the formula:

$$\varphi = OPD * 2\pi/\lambda$$

λ is a wavelength of light.

In one embodiment, there is an aperture slot set on the optical path and is between the light source and the wafer-level optical element, and each sub-optical element has the same radius. And the method further includes:

When the wafer-level optical element is mounted on the carrier, adjusting the aperture of the aperture slot according to the radius of each sub-optical element and the distance between each sub-optical element and adjacent sub-optical element, so as to make the radius of the spot that the lights projects on the wafer-level optical element greater than or equal to the radius of the sub-optical element, and less than or equal to the distance between the center of the sub-optical element and edge of the adjacent sub-optical element.

In one embodiment, the radius of each sub-optical element of the wafer-level optical element is consistent. In this situation, the aperture of the aperture slot needs to be adjusted once when the wafer-level optical element is mounted on the carrier.

Specifically, the radius of the spot that the lights project on the wafer-level optical element can be adjusted by adjusting the aperture of the aperture slot. Therefore, $r_1$, the radius of each sub-optical element is determined when the wafer-level optical element is mounted on the carrier. And $r_2$, the distance between the center of the sub-optical element and the edge of the sub-optical element is determined. And $r_3$, the radius of the spot satisfies the following condition by adjusting the aperture of the aperture slot: $r1 \le r3 \le r1+r2$. Therefore, when the lights are able to cover a single sub-optical element fully and the center of the light coverage area overlaps the center of a single sub-optical element in detection, the light coverage area and adjacent sub-optical element will not overlap.

It should be noted that when each sub-optical element isn't circle, $r_1$, the radius of each sub-optical element refers to the radius of the outer circle corresponding to each sub-optical element. And when the distance between the sub-optical element and the corresponding adjacent sub-optical element is not uniform, $r_2$ the distance between the center of the sub-optical element and the edge of the adjacent sub-optical element refers to the minimum distance selected from distances between the center of the sub-optical elements to the edge of the adjacent sub-optical elements.

In one embodiment, there is an aperture slot set on the optical path and between the light source and the optical element, and the wafer-level optical element includes the sub-optical elements with 2 kinds of radius. And the method further includes: when the interference images read the command, determining a target sub-optical element corresponding to the interference image to be read, and adjusting the aperture of the aperture slot based on the distance between the target sub-optical element and the adjacent sub-optical element so that the radius of the spot on the wafer-level optical element is greater than or equal to the radius of the target sub-optical element, and less than or equal to the distance between the center of the target sub-optical element and the edge of the adjacent sub-optical element.

In one embodiment, the radius of each sub-optical element of the wafer-level optical element is not uniform. In this situation, every time a new interference image is to be obtained, the aperture of the aperture slot needs to be adjusted to ensure that the read interference image matches the corresponding sub-optical element.

Specifically, in response to the detection of the interference image reading the command, the corresponding target sub-optical element of the read interference image is determined. $r_1$, the radius of each sub-optical element is determined when the wafer-level optical element is mounted on the carrier. And $r_2$, the distance between the center of the sub-optical element and the edge of the optical element is determined. And $r_3$, the radius of the spot satisfies the following condition by adjusting the aperture of the aperture slot: $r1 \le r3 \le r1+r2$. Therefore, when the lights are able to cover a single sub-optical element fully and the center of the light coverage area overlaps the center of a single sub-optical element in detection, the light coverage area and adjacent sub-optical element will not overlap.

It should noted that when each sub-optical element isn't circle, $r_1$, the radius of each sub-optical element refers to the radius of the outer circle corresponding to each sub-optical element. And when the distance between the sub-optical element and the corresponding adjacent sub-optical element is not uniform, $r_2$ the distance between the center of the sub-sub-optical element and the edge of the adjacent sub-optical element refers to the minimum distance selected from distances between the center of the sub-optical elements to the edge of the adjacent sub-optical elements.

The present application also provides an electronic device. The electronic device is in the form of a universal computing device. The components of the electronic device may include at least one processing unit, at least one storage unit, and a bus connecting different system components (including the storage unit and processing unit).

The storage unit has stored program code which may be executed by the processing unit so that the processing unit may implement the steps of the exemplary embodiments described in the various exemplary embodiments described above. For example, the processing unit may perform the steps as shown in FIG. 14.

The storage unit may include a readable medium in the form of a volatile storage unit, such as a random access storage unit (RAM) and/or a cache memory unit, and may further include a read-only storage unit (ROM).

The storage unit may also include a program/utility with a set of (at least one) program modules including, but is not limited to, the operating system, one or more applications, other program modules and program data, and each or some combinations of these examples may include an implementation of a network environment.

A bus may be a local bus representing one or more of several types of bus structures, including a storage unit bus or a storage unit controller, a peripheral bus, a graphical acceleration port, a processing unit, or using any of various bus structures.

The present application also provides a non-transitory computer readable storage medium storing a readable instruction, and the readable instruction will cause the computer to perform the method provided by any embodiment mentioned above when the readable instruction is executed by any of the processing units of the computer.

The above is only a specific embodiment of the embodiments of this disclosure, but the scope of protection of the embodiment of this disclosure is not limited to this. And those skilled in the field can easily think of any change or substitution for this disclosure, which should be covered within the protection scope of this disclosure. Therefore, the scope of the protection of the present disclosure shall be the scope of the claims.

What is claimed is:

1. A phase-detection device for an optical element, wherein along the direction of the optical path the phase-detection device comprises: a light source, a beam collimator, a filter, a diffraction element and an imaging detector;

the optical element to be detected is set between the filter and the diffraction element;

the diffraction element comprises a mesh mask region and an array region segmented by the mesh mask region; the mesh mask region is used to block lights of a target wavelength;

the array region comprises a first class of cell and a second class of cell, and the first class of cell and the second class of cell are alternatively arranged;

the first class of cell is used to provide a first phase for the lights of the target wavelength, and the second class of cell is used to provide a second phase for the lights of the target wavelength; a phase difference between the first phase and the second phase is $\pi$ rad;

the device further comprises a process; the process is communicatively connected to the imaging detector to determine a phase corresponding to the optical element according to an interference image recorded by the imaging detector, wherein the diffraction element is configured to eliminate diffracted light of second and higher diffraction orders and even-order diffracted light such that the emitted diffracted light contains only first-order diffracted light.

2. The phase-detection device for the optical element according to claim 1, wherein the optical element is a wafer-level optical element and the phase detection device comprises: a displacement platform, and the displacement platform comprise a carrier;

the wafer-level optical element comprises a plurality of sub-optical elements;

when the wafer-level optical element is mounted on the carrier, the wafer-level optical element is set on the optical path between the filter and the diffraction element.

3. The phase-detection device for the optical element according to claim 2, wherein the phase detection device further comprises:

a platform base;

a bottom surface of the displacement platform is fixed to a top surface of the platform base;

an open hole is set on the bottom surface of the displacement platform, and the open hole is through the platform base simultaneously;

an open end of the platform base is set toward a side of the beam collimator; a cavity is set inside the platform base; a beam steering device is set inside the displacement platform;

the filter is set on the optical path, and is between the beam collimator and the top surface of the displacement platform;

the carrier is a tray, and the tray is set on the top surface of the displacement platform, and the tray is capable of moving parallel to the top surface of the displacement platform; the tray is set on the optical path between the filter and the diffraction element; the shape of the tray is a ring;

a step structure is set along an inner wall of the tray; the wafer-level optical element set on the tray by setting on the step structure;

the displacement platform comprises a carrier.

4. The phase-detection device for the optical element according to claim 3, wherein a plurality of step structures are set along the inner wall of the tray.

5. The phase-detection device for the optical element according to claim 3, wherein the inner wall of the tray comprises at least two ear structures, and the two ear structures are convex to an outer wall of the tray.

6. The phase-detection device for the optical element according to claim 3, wherein there is at least one notch structure set on an edge of the wafer-level optical element; there is at least one projection structure set on an inner wall of the wafer-level optical element; when the wafer-level optical element is attached to the platform of the step structure, the projection structure is embedded in the notch structure.

7. The phase-detection device for the optical element according to claim 3, wherein the beam steering device is a reflecting mirror.

8. The phase-detection device for the optical element according to claim 3, wherein an aperture slot is set on the optical path between the beam collimator and the tray; and an aperture of the aperture slot is adjusted.

9. The phase-detection device for the optical element according to claim 3, wherein the device comprises a bracket support, and the bracket support is set on a side of the displacement platform;

the bracket support comprises a support, and the bracket support is set on the displacement base;

the imaging detector is fixed to the support, and the imaging detector is vertically facing toward the displacement platform;

the diffraction element is set below the imaging detector.

10. The phase-detection device for the optical element according to claim 9, wherein the bracket support comprises a top surface of the bracket support fixed to the platform base and at least three support rods;

the bracket support is a dome bracket;

the dome bracket is set over the displacement platform; and the imaging detector is fixed to the center of the dome bracket.

11. The phase-detection device for the optical element according to claim 9, wherein the diffraction element is fixed below the imaging detector by the support.

12. The phase-detection device for the optical element according to claim 9, wherein the diffraction element is fixed below the imaging detector by a structural element of the imaging detector.

13. The phase-detection device for the optical element according to claim 12, wherein the structural element is a tubular structural element, and the tubular structural element comprises an inner wall of threads;

the outer wall of the imaging detector comprises threads, and the tubular structural element is set on the outer wall of the imaging detector by threads;

the tubular structural element extends downward to the outer wall of the imaging detector and the diffraction element is fixed to the inner wall of the tubular structural element outside the imaging detector, so that the diffraction element is fixed below the imaging detector.

14. The phase-detection device for the optical element according to claim 1, wherein the beam collimator is a reflective collimator.

15. The phase-detection device for the optical element according to claim 1, wherein the diffraction element is a hybrid grating, and the hybrid grating comprises a mesh mask grating and a 2D array grating;

in the 2D array grating, a height difference between the first class of cell and the second class of cell is;

wherein, is a target wavelength, n is a refractive index of the 2D array grating at the target wavelength.

16. The phase-detection device for the optical element according to claim 15, wherein an antireflection film is coating on one surface facing toward an incident light of the 2D array grating.

17. The phase-detection device for the optical element according to claim 1, wherein a distance between the diffraction element and the imaging detector is greater than or equal to 1 mm, and is less than or equal to 5 cm.

18. A phase detection method for a wafer-level optical element, wherein the method is applied to the phase detection device claimed as claim 1, when a wafer-level optical element is mounted to a carrier of the displacement platform, along the direction of the optical path the phase detection device comprises: a light source, a beam collimator, a filter, a wafer-level optical element, a diffraction element and an imaging detector;

when a light is incident to the wafer-level optical element, the radius of the light coverage area is greater than or equal to a radius of each sub-optical element, and is less than or equal to the distance between the edge and the center of each wafer-level optical element;

a plurality of edge sub-optical elements at the edge of the wafer-level optical element are pre-calibrated;

the method comprises:

when the reset of the carrier is completed and the wafer-level optical element is mounted on the carrier, controlling the movement of the carrier until the interference image corresponding to the edge sub-optical elements is detected and obtained;

correcting a position of the carrier by setting a target that a center deviation between the interference image of the edge sub-optical element and an image of the imaging detector is less than a pre-set threshold, so as to make the wafer-level optical elements at an initial target attitude and an initial target position;

when the correction of the carrier is completed, the carrier is controlled to sequentially move each sub-optical element of the wafer-level optical element to a position at the center of the imaging detector to perform a phase detection of the sub-optical elements based on the corresponding interference image of the sub-optical elements.

19. The method according to claim 18, wherein along the direction of the optical path, there is an aperture slot set on the optical path between the light source and the optical element, and the wafer-level optical element comprises optical elements with two kinds of radius;

the method further comprises: when the interference images read a command, determining a target sub-optical element corresponding to the interference image to be read, and adjusting the aperture of the aperture slot based on the distance between the target sub-optical element and the adjacent sub-optical element, so that the radius of the spot on the wafer-level optical element is greater than or equal to the radius of the target sub-optical element, and less than or equal to the distance between the center of the target sub-optical element and the edge of the adjacent sub-optical element.

20. The method according to claim 18, wherein there is an aperture slot set on the optical path and is between the light source and the optical element, and each sub-optical element has the same radius;

the method further comprises: when the wafer-level optical element is mounted on the carrier, adjusting the aperture of the aperture slot according to the radius of each sub-optical element and the distance between each sub-optical element and adjacent sub-optical element, so as to make the radius of the spot that the lights projects on the wafer-level optical element greater than or equal to the radius of the sub-optical element, and less than or equal to the distance between the center of the sub-optical element and edge of the adjacent sub-optical elements.

* * * * *